United States Patent
Eggimann et al.

(10) Patent No.: US 10,922,502 B2
(45) Date of Patent: Feb. 16, 2021

(54) STRUCTURAL UNIT FOR A LINEAR ACTUATOR

(71) Applicant: SKF MOTION TECHNOLOGIES AB, Gothenburg (SE)

(72) Inventors: Benjamin Eggimann, Birmensdorf (CH); Rudolf Kamber, Langenthal (CH)

(73) Assignee: SKF Motion Technologies AB, Gothenburg (SE)

( * ) Notice: Subject to any disclaimer, the term of this patent is extended or adjusted under 35 U.S.C. 154(b) by 0 days.

(21) Appl. No.: 16/442,738

(22) Filed: Jun. 17, 2019

(65) Prior Publication Data

US 2019/0384950 A1 Dec. 19, 2019

(30) Foreign Application Priority Data

Jun. 15, 2018 (DE) .................... 10 2018 209 703.8

(51) Int. Cl.
| | |
|---|---|
| *G06K 7/10* | (2006.01) |
| *G01M 13/02* | (2019.01) |
| *F16H 25/20* | (2006.01) |
| *H04L 29/08* | (2006.01) |

(52) U.S. Cl.
CPC ......... *G06K 7/10297* (2013.01); *F16H 25/20* (2013.01); *G01M 13/02* (2013.01); *H04L 67/1097* (2013.01); *H04L 67/12* (2013.01)

(58) Field of Classification Search
None
See application file for complete search history.

(56) References Cited

U.S. PATENT DOCUMENTS

| | | | |
|---|---|---|---|
| 2005/0255186 A1 | 11/2005 | Hiraga | |
| 2006/0113940 A1 | 6/2006 | Nagai et al. | |
| 2008/0064354 A1 | 3/2008 | Yoshioka et al. | |
| 2019/0017626 A1* | 1/2019 | Hebert | ................ F16K 37/0025 |
| 2019/0048988 A1* | 2/2019 | Besser | ................... H02K 11/35 |

FOREIGN PATENT DOCUMENTS

| | | | |
|---|---|---|---|
| CN | 106120666 A | * | 11/2016 |
| DE | 102010050837 A1 | | 5/2012 |
| EP | 1595681 A1 | | 11/2005 |
| JP | 2005201390 A | | 7/2005 |
| WO | 2017048788 A1 | | 3/2017 |

* cited by examiner

*Primary Examiner* — Kristy A Haupt
(74) *Attorney, Agent, or Firm* — Laurence A. Greenberg; Werner H. Sterner; Ralph E. Locher

(57) ABSTRACT

A structural unit, in particular a spindle unit, for a linear actuator which has at least one structural unit. The structural unit transmits data by way of electromagnetic radiation and/or it is configured to wirelessly absorb energy and then electrically supply at least one electrical load with wirelessly absorbed energy.

12 Claims, 3 Drawing Sheets

STRUCTURAL UNIT FOR A LINEAR ACTUATOR

CROSS-REFERENCE TO RELATED APPLICATION

This application claims the priority, under 35 U.S.C. § 119, of German patent application DE 10 2018 209 703.8, filed Jun. 15, 2018; the prior application is herewith incorporated by reference in its entirety.

BACKGROUND OF THE INVENTION

Field of the Invention

United States patent application publication US 2019/0048988 A1 and its counterpart international patent application WO2017/048788A1 disclose a linear actuator having a tube and a structural unit that is able to be extended from the tube. The linear actuator has a sensor. Further prior art is disclosed by documents German published patent application DE 102010050837 A1, Japanese patent application JP 2005201390 A, U.S. patent application US 2005/0255186 A1 and its counterpart European patent application EP 1595681 A1, and U.S. patent application publications US 2006/0113940 A1 and US 2008/0065354 A1.

SUMMARY OF THE INVENTION

It is a primary object of the instant invention to provide a structural unit for a linear actuator which achieves a long service life.

With the above and other objects in view there is provided, in accordance with the invention, a structural unit for a linear actuator, in particular a spindle drive unit, the structural unit comprising:

a configuration configured to transmit data by way of electromagnetic radiation and/or configured to wirelessly absorb energy and to then electrically supply at least one electrical load with wirelessly absorbed energy.

In other words, we describe a structural unit, in particular a spindle unit, for a linear actuator, which unit is designed to transmit data by way of electromagnetic radiation and/or is designed to wirelessly absorb energy and then electrically supply at least one electrical load with wirelessly absorbed energy. "Wireless" energy absorption should be understood to mean energy absorption that differs from energy absorption that takes place exclusively through electric current that flows from a unit that outputs energy to a unit that absorbs energy through a conductor consisting of a solid body. According to the invention, a long service life is achieved. Wear to cables is in particular able to be avoided.

Further features which are considered as characteristic for the invention are set forth in the appended claims.

Although the invention is illustrated and described herein as embodied in a structural unit for a linear actuator, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
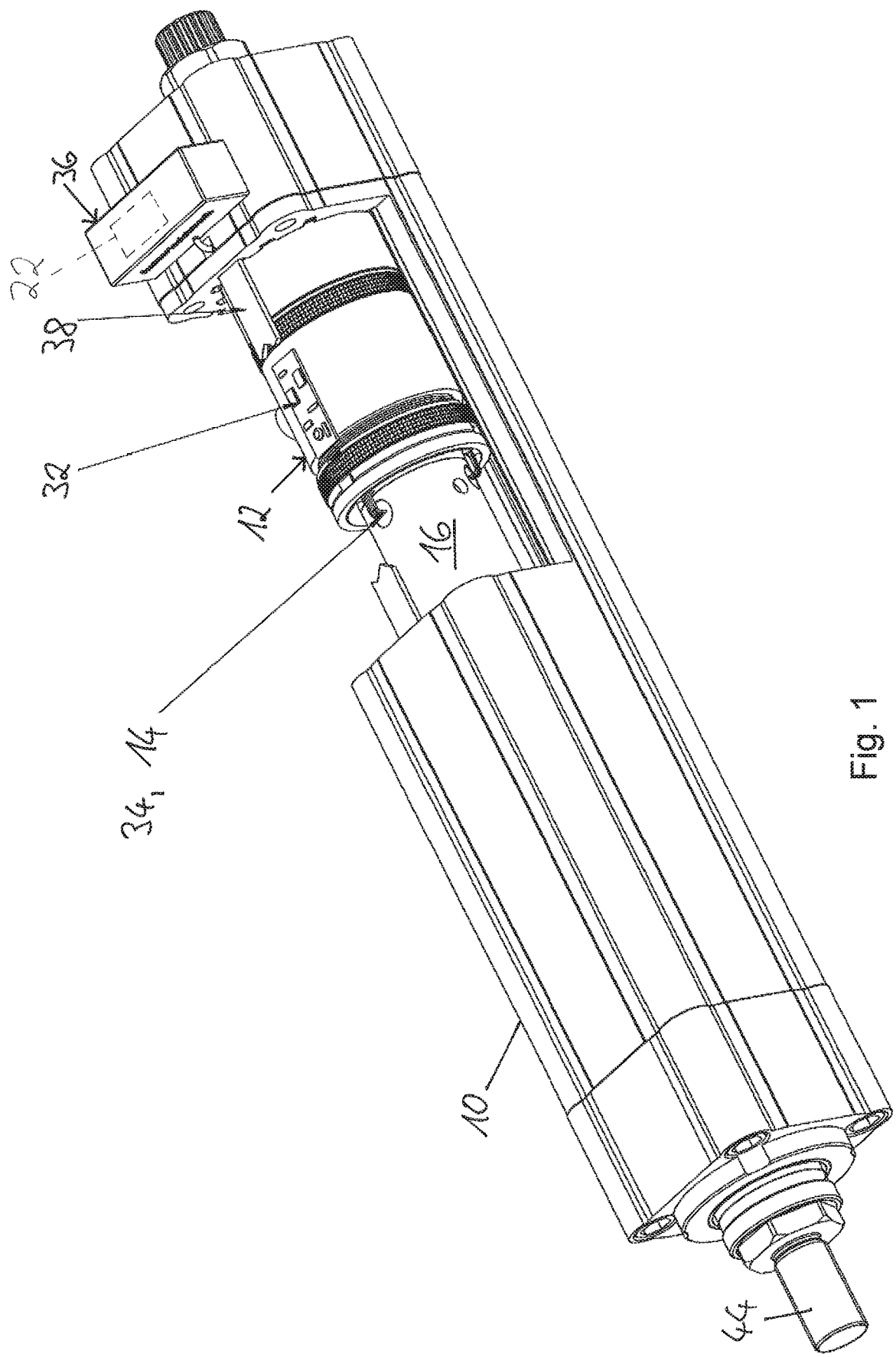
FIG. 1 shows a perspective and partly broken-away view of a linear actuator according to the invention.
Figure 2:
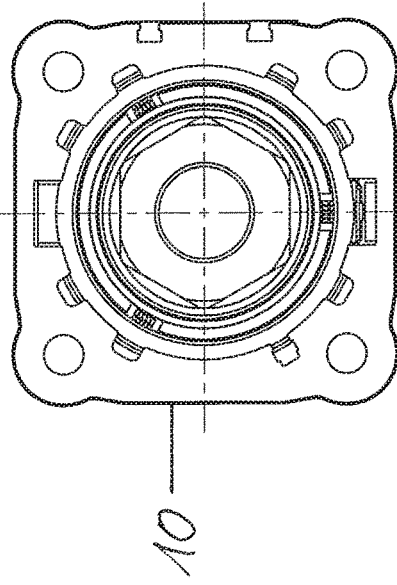
FIG. 2 shows a cross section of the linear actuator.
Figure 3:
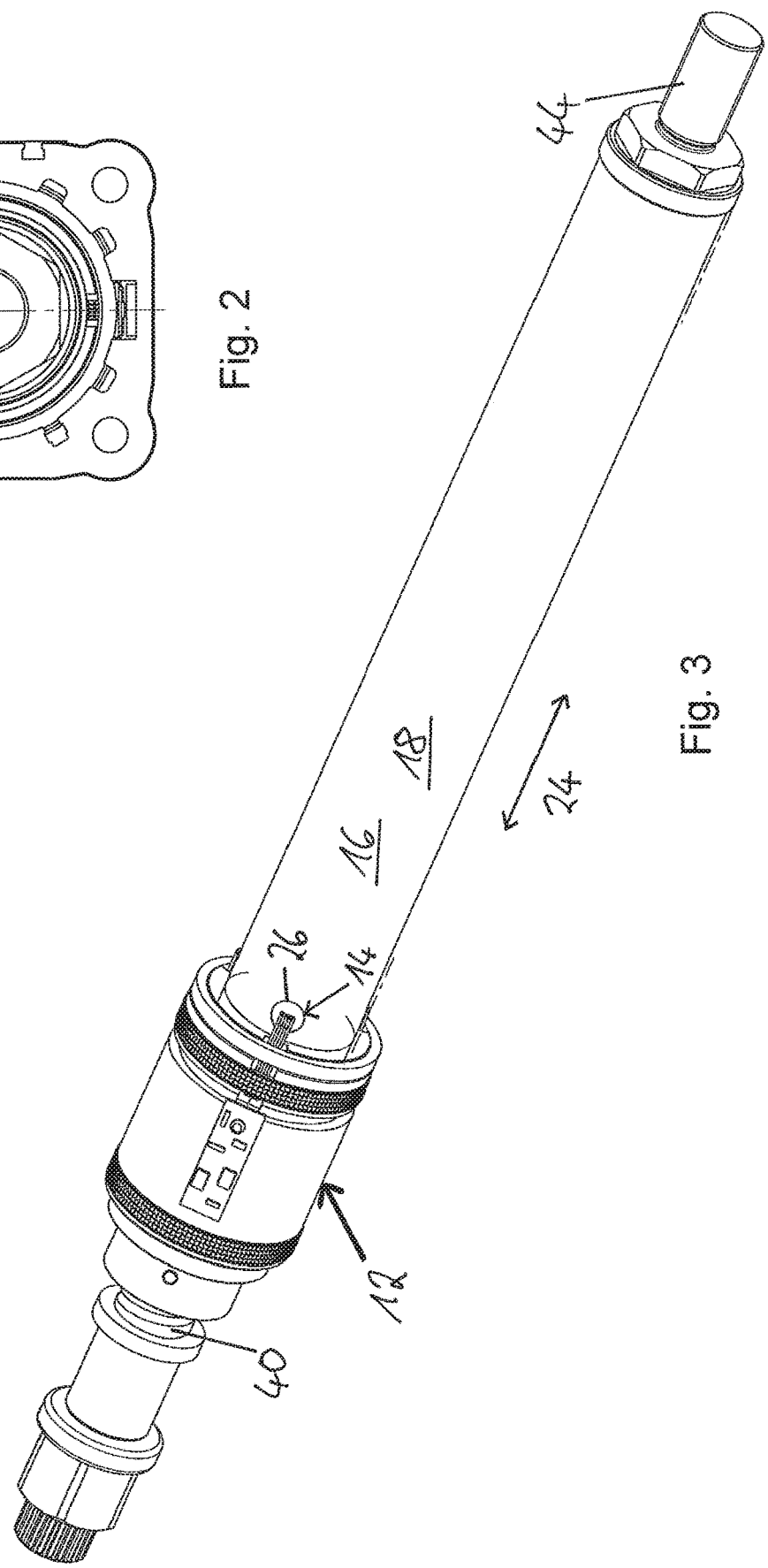
FIG. 3 shows a structural unit and a threaded spindle of the linear actuator.
Figure 4:
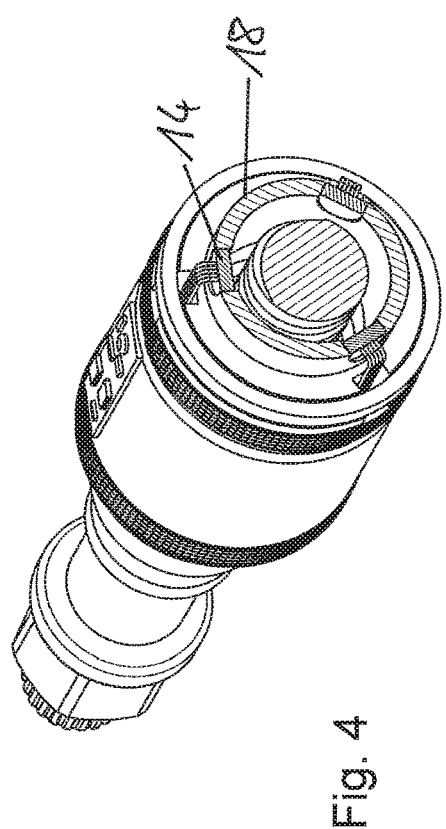
FIG. 4 shows a perspective view of a cross section of the structural unit together with the threaded spindle.
Figure 5:
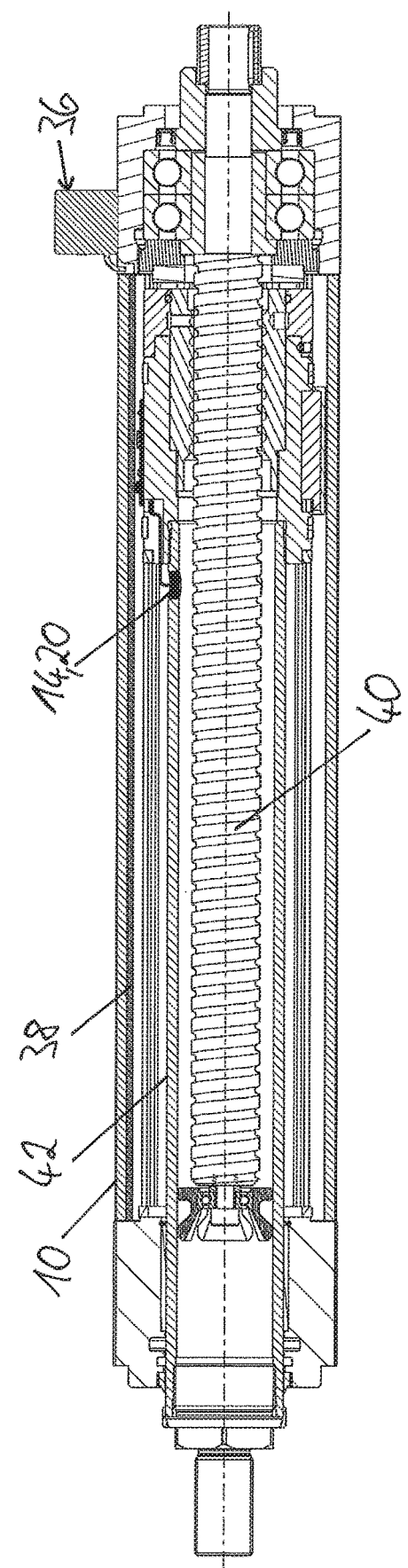
FIG. 5 shows a longitudinal section through the linear actuator.

Referring now to the figures of the drawing in detail and first, particularly, to FIG. 1 thereof, there is shown a linear actuator according to the invention. The linear actuator has an outer tube 10 and a structural unit 12 that is able to be partly moved out of the tube and back into the tube 10 in a straight line relative to the tube. The movement is brought about by a non-illustrated motor that is able to turn a threaded spindle 40 (see, FIGS. 3 and 5), whose center of gravity rests relative to the tube 10, about the tube 10, as a result of which a nut of the structural unit 12, which nut is fixed in relation to a circumferential direction relative to the tube 10 and into which nut the threaded spindle is screwed, is able to be moved in a straight line together with the entire structural unit 12 relative to the tube 10.

The linear actuator furthermore has a sensor unit 14 that is designed to measure deformation characteristic variables of the structural unit 12. The sensor unit 14 is arranged at a radial outer region 16 of the structural unit. A tube 42 of the structural unit 12 comprises a wall 18 of the structural unit. The wall 18 has a recess 26 that is designed as a through-hole of the tube. The sensor unit 14 is arranged in the recess 26 and bears on a boundary of the recess 26 along a circumference of the recess 26. The sensor unit 14 has the shape of a circular cylinder, but may in principle also have another shape. In a view along a radial direction of the tube 42 onto the recess 26, both the recess 26 and the sensor unit 14 have a circular shape, as a result of which easy and inexpensive manufacturability for both the recess 26 and the sensor unit 14 is ensured.

The sensor unit 14 has a first strain gauge 20 whose longitudinal direction is parallel to a longitudinal direction of the tube 42 and parallel to a longitudinal direction 24 of the structural unit 12. If the structural unit 12 is extended out of the tube 10, then a force is exerted in the longitudinal direction 24 of the structural unit 12 by an attachment 44 that is part of the structural unit 12 and is attached to an end of the tube 42. The tube 42 is deformed by this force, and so the recess 26 is likewise compressed in the longitudinal direction 24, and the sensor unit 14 and the strain gauge 20 are thereby also compressed in the longitudinal direction 24. The measurement results of the sensor unit 14 are forwarded to an evaluation unit 22 of the linear actuator that is arranged outside the tube 10. The evaluation unit calculates the magnitude of the force from the measurement results. In one alternative exemplary embodiment, the evaluation unit is arranged inside the tube 10. The strain gauge 20 thus measures the magnitude of the extension of the recess 26 along the longitudinal direction 24 when force is acting, which constitutes a deformation characteristic variable of the structural unit 12.

In the present exemplary embodiment, the sensor unit is a module having a plate girder to which three further strain gauges are attached, in addition to the strain gauge 20. The four strain gauges are arranged in a full bridge. In one alternative exemplary embodiment, the sensor unit 14 has only a single strain gauge.

The structural unit 12 furthermore has three acceleration sensors that measure accelerations of the structural unit 12 that are in each case aligned perpendicular to one another. In alternative exemplary embodiments, the structural unit 12 has two acceleration sensors or else just one acceleration sensor. The structural unit 12 furthermore comprises a temperature sensor that is arranged adjacent to the nut of the structural unit 12.

The linear actuator furthermore comprises a structural unit 32 that is designed to transmit data through electromagnetic radiation and that is designed to wirelessly absorb energy and then electrically supply an electrical load 34 with the wirelessly absorbed energy. The electrical load 34 is the sensor unit 14. The structural unit 32 also supplies itself with electrical energy. The other sensor units or sensors mentioned are likewise supplied with energy by the structural unit 32. The structural unit 32 is designed as an NFC tag. Energy that is obtained by the structural unit 32 is buffer-stored by a capacitor for forwarding to the load 34. Because the structural unit 32 is part of the structural unit 12, it is at least at times arranged inside the tube 10 due to the ability of the structural unit 12 to move relative to the tube 10.

The linear actuator furthermore has an electronic unit 36 that is designed to emit electromagnetic radiation in order to transfer information and in order to transfer energy into an interior of the tube 10. The radiation takes place by way of an antenna 38, arranged on and attached to an inside of the tube 10, of the electronic unit (see, FIGS. 1 and 5). The antenna 38 is part of an NFC reader of the electronic unit. The NFC tag and the NFC reader are each designed to interact with one another. To obtain energy, the NFC tag receives electromagnetic waves that have been emitted from the NFC reader and converts them into energy.

In other exemplary embodiments, NFC readers and NFC tags are replaced with other radio technology structural units having a similar functional scope. The NFC standard is thus not decisive for the functioning of the invention and of the exemplary embodiment.

The electronic unit furthermore has a non-illustrated transmission unit that is designed to transmit information to a receiver remote from the linear actuator by way of electromagnetic radiation. By way of this transmission unit, data that originate from the sensor units or the sensors of the structural unit 12, after they have been transmitted by the structural unit 32 to the electronic unit through electromagnetic waves that are received by the antenna, may be transmitted to the remote receiver. As an alternative or in addition to the evaluation unit 22, this receiver may have an evaluation unit that evaluates the data. The electronic unit may furthermore have a reception unit that is designed to receive information from a transmitter remote from the linear actuator by way of electromagnetic radiation. The remote receiver and the remote transmitter may be implemented in a single device. By way of the remote receiver or transmitter, it is made possible for the electronic unit to transmit data to the cloud, and the linear actuator is thereby part of the Internet of Things. The cloud may store the transmitted data. The linear actuator may furthermore create a connection to a smart device, such as in particular a smartphone, through the remote receiver or transmitter.

The evaluation unit 22 is designed as a computing unit that is designed, through its software, on the basis of data that the computing unit has transmitted to it directly or indirectly in at least one operating mode by a sensor of the linear actuator, to determine a recommendation for an exchange time for a mechanical component of the linear actuator. As an alternative or in addition, the evaluation unit, which is remote from the linear actuator, takes over this determination of a recommendation of an exchange time.

The load range able to be measured by the sensor unit 14, due to the sensor unit 14 being arranged in the recess 26, depends on the size of the tube 42. If the design of the tube 42 is selected appropriately, the desired load range is thus able to be sensed by way of the sensor unit 14 and the strain gauge 20. Of course, the resolution of the strain gauge 20 in relation to force determinations depends greatly on the size of the tube 42. With a suitable design of the respective tube 42, the same sensor unit 14 and the same strain gauge 20 may therefore be used for linear actuators according to the invention of different sizes.

The strain gauge 20 may be vapor-deposited directly onto a substrate of the sensor unit 14. In one alternative embodiment, the strain gauge 20 may also be vapor-deposited directly onto the structural unit 12 or the tube 42. It is also conceivable in principle for the strain gauge to be manufactured through thick film technology.

The data may be transmitted to the receiver, remote from the linear actuator, in particular using radio standards, such as for example using the GSM standard or the Bluetooth standard.

In one alternative embodiment of the invention, the electronic unit 36 is arranged inside the tube 10.

The electrical connection of the sensor unit and therefore the supply of power to and evaluation of the sensors takes place through flexible electrical conductors.

In one alternative exemplary embodiment, the sensor unit 14 is attached to a radial outer surface of the tube 42 by two pins. The sensor unit 14 then measures the change in the distance between the two pins.

The following is a summary list of reference numerals and the corresponding structure used in the above description of the invention:
  10 Tube
  12 Structural unit
  14 Sensor unit
  16 Outer region
  18 Wall
  20 Strain gauge
  22 Evaluation unit
  24 Longitudinal direction
  26 Recess
  32 Structural unit
  34 Load
  36 Unit
  38 Antenna
  40 Threaded spindle
  42 Tube
  44 Attachment

The invention claimed is:

1. A structural unit for a linear actuator, the structural unit comprising:
   a configuration configured to wirelessly absorb energy and to then electrically supply at least one electrical load with wirelessly absorbed energy.

2. The structural unit according to claim 1 configured as a spindle unit.

3. A linear actuator, comprising:

an outer tube;

a structural unit according to claim 1 movably disposed relative to said outer tube;

at least one electronic unit configured to radiate electromagnetic radiation in order to transfer information and/or energy into an interior of said outer tube of the linear actuator.

4. The linear actuator according to claim 3, wherein said structural unit is at least at times arranged inside the outer tube.

5. The linear actuator according to claim 3, wherein said electronic unit has at least one antenna disposed on an inside of said outer tube.

6. The linear actuator according to claim 3, wherein said electronic unit has an NFC reader.

7. The linear actuator according to claim 6, wherein said structural unit has at least one NFC tag configured to interact with said NFC reader.

8. The linear actuator according to claim 3, wherein said electronic unit further comprises:

at least one transmission unit configured to transmit information to a receiver remote from the linear actuator by way of electromagnetic radiation; and/or at least one reception unit configured to receive information from a transmitter remote from the linear actuator by way of electromagnetic radiation.

9. The linear actuator according to claim 8, being a linear actuator configured to store data in an Internet cloud and/or being a part of the Internet of Things.

10. The linear actuator according to claim 3, further comprising at least one computing unit that is configured, based on data that the computing unit has received directly or indirectly, in at least one operating mode, from a sensor of the linear actuator, to determine a recommendation for a time when a mechanical component of the linear actuator should be exchanged.

11. A system, comprising:

a linear actuator according to claim 3 having a sensor;

a computing unit configured to receive data from said sensor, and said computing unit being configured, based on data received directly or indirectly in at least one operating mode, from said sensor, to determine a recommendation for an exchange time for a mechanical component of the linear actuator.

12. The structural unit according to claim 1 wherein said configuration is configured to transmit data by way of electromagnetic radiation.

* * * * *